Oct. 18, 1966
L. MANNAIONI
3,279,288
HYDRAULIC OIL DEVICE FOR TOOL DIFFERENTIAL
PILOT CONTROL IN MACHINE TOOLS
Filed July 28, 1964
2 Sheets-Sheet 1
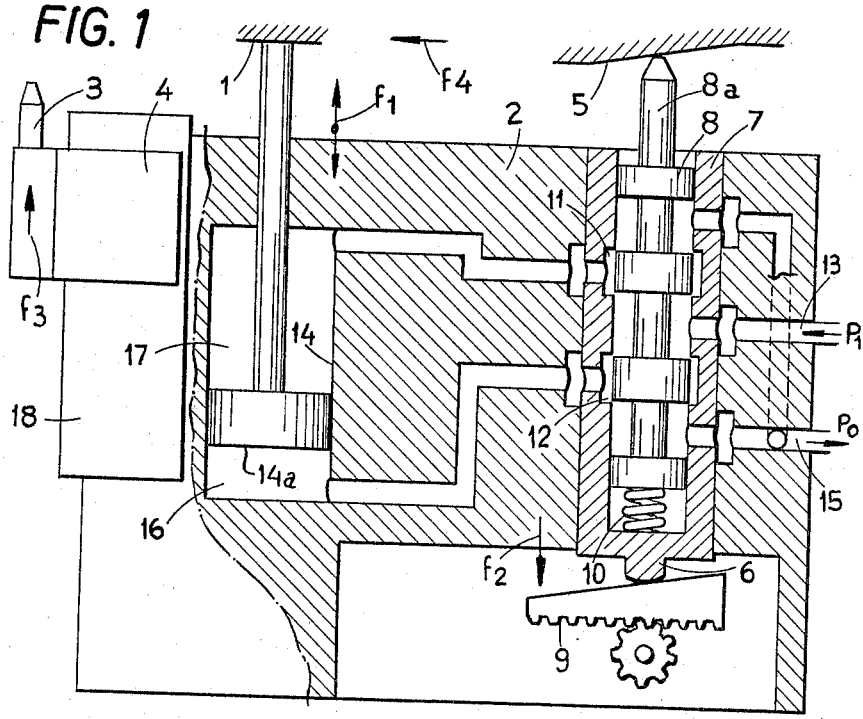
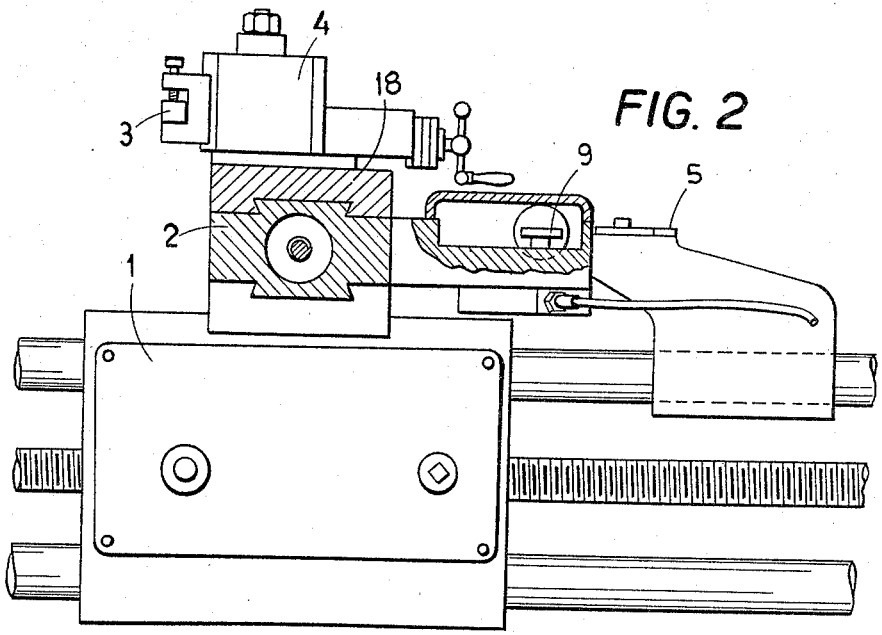
INVENTOR:
LELIO MANNAIONI
By E. M. Squire
Atty.

INVENTOR:
LELIO MANNAIONI
By
E. M. Squire
ATTY ended cylindrical cavity in which there is housed the slide valve which comprises a hollow cylindrical body forming a sleeve for an inner slide valve member, which, by means of a spring re-acting on the bottom of the cylindrical body, is yieldingly urged into sliding engagement with the template determining the profile of the workpiece during the machining. The sleeve is simultaneously urged by the same spring to contact the member effecting the incremental movement.

The slide valve is designed to allow the flow of hydraulic fluid into one or other of two cavities on opposite sides of the piston and at the same time permit the discharge of the spent pressure fluid through appropriate exhaust channels.

The relative movement between the piston and its associated cylinder determines the movements of the slide until the two slide valve members return into a position of mutual balance.

A device according to this invention, is shown by way of example, in the accompanying drawings; in which:

FIG. 1 is a schematic illustration of the hydraulic system of the device;

FIG. 2 is a side elevational view, partly broken away and shown in section parallel to the direction of motion of the carriage of a lathe incorporating a device according to the invention;

The operation of this device is described below as a hydraulic copying system applied to a machine, in particular to a screw-cutting lathe.

Figure 3:
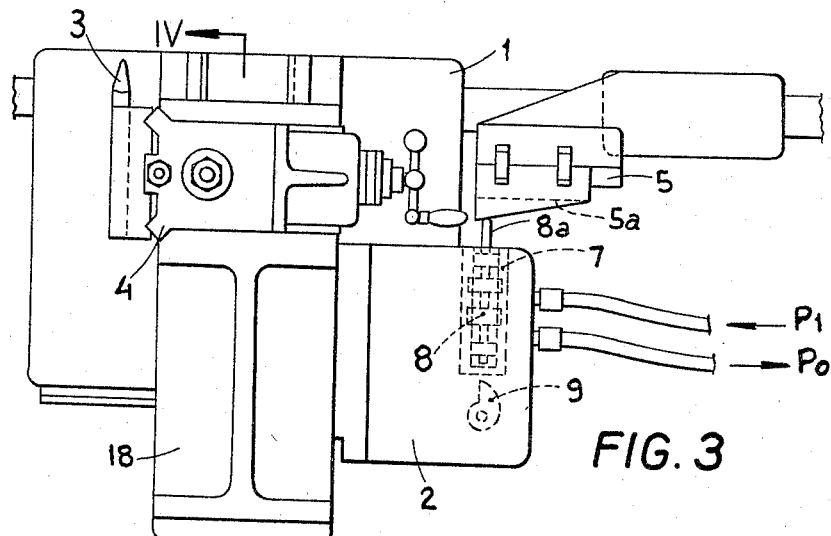
FIG. 3 is a plan view of the device shown in FIG. 2.
Figure 4:
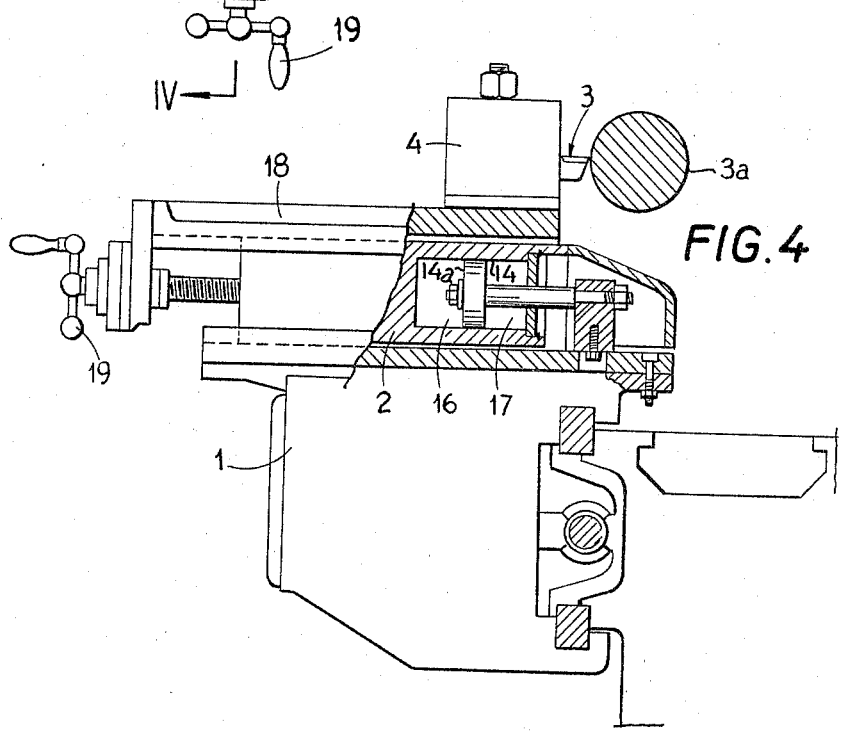
FIG. 4 is an end view partly broken away and shown in section taken along the line IV—IV of FIG. 3.

Refering now to drawings, 1 denotes the carriage, and 2 denotes a slide whose movements are to be controlled, the slide being capable of effecting movements in the directions of the arrow $f1$ perpendicularly of the movement of the carriage 1 on which the slide is mounted A cutting tool 3 is carried by a tool post 4 which in turn is mounted on the slide in such a manner as to effect movement of the tool towards (in the direction of the arrow $f3$) and away from the workpiece $3a$ (see FIG. 4), these movements being relative to the slide 2. A template 5 has a particular profile (as shown in FIG. 3, for instance, for cutting tapering threads), and is mounted in a stationary position on the machine bed.

In the slide 2 there is mounted an axially slidable cylindrical sleeve 7. This sleeve has an integral extension or stylus 6 which follows a cam 9 mounted in the slide 2 and against which the stylus 6 is yieldingly urged by a helical compression spring 10. This spring reacts upon a slide valve 8 which is housed inside the sleeve 7 and has at its outer end a stem or stylus $8a$ forming a contact follower for the template 5.

The cam 9 may be arranged for translational or rotational movement, the incremental advance or feed of this cam being determined by successive traverses of the carriage and which thus serves to give an increment of feeding movement to the position of the tool 3.

Oil, at a pressure P1 flows from a pump (not shown) through a conduit 13 and communicates with a cylinder 14 containing a piston $14a$ through the inner sides of annular cavities 11 and 12, the outer sides of these cavities being in communication with the spent oil which is discharged through the conduit 15 at an exhaust pressure P0.

Movement of the sleeve 7 in either direction causes the outer and inner sides of the cavities 11 and 12 to be blocked so that oil at the high pressure P1 acts on one side of the piston $14a$, while the other side is at the discharge pressure P0.

This pressure difference causes movement of the slide 2 and sleeve 7 as a unit, (the piston 14a being fixed), in a direction opposite to the movement of the sleeve, until the annular cavities 11 and 12 return into their mean or equilibrium position with respect to the valve member 8.

Assuming that the cam 9 is moved in such a manner as to advance the sleeve 7 in the direction of the arrow f2 and thus vary the relative position of the annular cavities 11 and 12, the cavity 11 closes the discharge passage and places the tool advancing chamber 17 of the cylinder 14 in communication with the delivery conduit 13 only, while the cavity 12 closes the delivery passage and places the tool retracting chamber 16 of the cylinder 14 in communication only with the discharge conduit 15.

The slide, together with the tool post and the tool, therefore approaches the workpiece in the direction of arrow f3 until the annular cavities 11 and 12 return into their equilibrium position.

The tool 3 moves, advancing in the direction of the arrow f3, through a distance equal to that moved through by the sleeve 7 in the direction of the arrow f2 which actually corresponds to the incremental movement imposed by the cam 9.

Assuming now that the cam 9 is stationary, longitudinal movement of the carriage 1 in the direction of the arrow f4 causes the slide valve 8 to move in conformity with the shape of the template 5 by reason of the stylus 8a following the profile of the template 5.

This movement of the slide valve 8 results in an equal movement of the tool 3 in the same direction as that of the stylus 8a in a similar manner to that described above. In particular, successive movements of the slide valve 8 in the direction of the arrow f2 cause the cavity 12 to isolate the discharge conduit 15 and place the tool retracting chamber 16 in communication with the delivery conduit 13 only, the cavity 11 insulating the delivery conduit 13 and placing the tool advancing chamber 17 in communication only with the discharge conduit 15. The slide thus begins to withdraw the tool 3 from the workpiece reproducing exactly the profile of the template 5.

When the workpiece is not required to be shaped by the template 5, this will be replaced by a plain-faced stationary bearing surface indicated in dotted lines as 5a in FIG. 3 so that the movement of the tool is determined solely through the increments imposed by the cam 9.

When both of the movement controls are in action simultaneously the algebraic sum of the two movements, previously considered alone, is obtained.

Additionally, the slide 2 is surmounted by another slide 18 which is separately operative to cause the tool 3 to be approached to, or withdrawn from, the workpiece being machined, as desired. Movement of tne slide 18 may be effected by hand through the handwheel 19, or alternatively it may be effected automatically through a hydraulic piston. While I have shown and described what I believe to be the best embodiment of my invention, it will be apparent to those skilled in the art that various changes and modifications may be made therein without departing from the spirit and scope of the invention as defined in the appended claims.

What I claim is:

1. An hydraulic control device to be mounted on the carriage of a machine for shaping a workpiece by a tool, comprising an hydraulic operator for effecting advancing and retracting movements of the tool in response to the flow of hydraulic fluid, a first slide valve member carrying a stylus for engaging a template defining the shape of a pattern to control said flow and a second slide valve member carrying a stylus for engaging a cam to vary the flow in a sense to superimpose an incremental advance of the tool on said movements of the tool.

2. A device according to claim 1, wherein said hydraulic operator comprises a piston relatively movable within a cylinder, the relative movement being controlled by said styli.

3. A device according to claim 2, wherein either of the first and second slide valve members may be locked so as to cause the non-locked member solely to determine the movement of the tool.

4. A device according to claim 1, wherein said second silde valve member and said cam are mounted for movement as a unit along with said tool.

5. An hydraulic pattern-copying device to be mounted on a machine for shaping a workpiece, said device comprising: a movable slide for supporting a tool-holder, a fluid-controlled piston operative within a cylinder for moving said slide, a movable first stylus co-operable with a template defining a pattern which determines the finished shape of the workpiece, said first stylus continuously controlling the movement of said piston relative to said cylinder in accordance with said pattern to advance and retract said tool holder, and a movable second stylus co-operable with a cam determining incremental advancing movements of said tool holder, said second stylus cooperating with said first stylus for controlling the movement of said piston relative to said cylinder in accordance with the algebraic sum of the movements of said styli.

6. A device according to claim 5 wherein said first and second styli effect movement of first and second relatively movable slide valve members, respectively.

7. A device according to claim 6, wherein the first and second slide valve members are mounted one within the other and are relatively axially movable from a position of equilibrium, in response to movement of one or both styli, to control the flow of fluid to said piston and effect relative movement between the piston and cylinder in a sense such as to restore said slide valve members to the equilibrium position.

References Cited by the Examiner
UNITED STATES PATENTS

| | | | |
|---|---|---|---|
| 2,913,945 | 11/1959 | Granberg et al. | 82—14 |
| 3,194,092 | 7/1965 | Piotrowski | 82—14 |
| 3,207,012 | 9/1965 | Cudnohufsky | 82—14 |

WILLIAM W. DYER, Jr., *Primary Examiner*

G. A. DOST, *Assistant Examiner.*